US007517163B1

(12) United States Patent
Addison et al.

(10) Patent No.: US 7,517,163 B1
(45) Date of Patent: Apr. 14, 2009

(54) PRESSURE PAD ENGAGEMENT MECHANISM USING SLIDING ACTUATOR

(75) Inventors: Danny H. Addison, Durham, NC (US); Stacy L. Arrington, Raleigh, NC (US); Richard H. Harris, Raleigh, NC (US); Robert A. Myers, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/179,710

(22) Filed: Jul. 25, 2008

(51) Int. Cl.
*G06K 7/08* (2006.01)
*B41J 5/40* (2006.01)

(52) U.S. Cl. .......................... 400/73; 400/320; 235/379; 382/139; 382/320

(58) Field of Classification Search ................... 400/73; 382/139, 320
See application file for complete search history.

(56) References Cited

U.S. PATENT DOCUMENTS

| | | | |
|---|---|---|---|
| 4,518,271 | A | 5/1985 | Hirata |
| 4,693,621 | A | 9/1987 | Kawauchi |
| 4,961,658 | A | 10/1990 | Takagi |
| 5,499,804 | A | 3/1996 | Harada et al. |
| 5,813,781 | A | 9/1998 | Harris et al. |
| 5,867,585 | A | 2/1999 | Myers |
| 5,893,667 | A | 4/1999 | Kinney et al. |
| 6,089,450 | A | 7/2000 | Koeple |
| 6,290,129 | B2 | 9/2001 | Momose |
| 6,466,384 | B1 | 10/2002 | Myers et al. |
| 6,478,491 | B2 | 11/2002 | Nishimura et al. |
| 7,383,993 | B1 | 6/2008 | Harris et al. |
| 2003/0173830 | A1 | 9/2003 | Smith |

FOREIGN PATENT DOCUMENTS

| | | |
|---|---|---|
| DE | 4107481 | 9/1992 |
| EP | 1708068 | 10/2006 |

*Primary Examiner*—Leslie J Evanisko
(74) *Attorney, Agent, or Firm*—Patents on Demand, PA; Brian K. Buchheit

(57) ABSTRACT

A slide track of a notched slider control can include a continuous path extending between two end points. A slider can be a graphical element able to move along the slide track. The end points can correspond to upper and lower extremes of a value range. Positions between the end points can represent values within the value range. The slide track can include at least one notch that is visually represented within the slide control as a deviation from a straight line segment having the two end points. The notch corresponds to a value within the value range. The notch can causes the slider to become fixed at a point along the slide track whenever a pointing device controlling the slider is moved in a direction of the deviation.

3 Claims, 5 Drawing Sheets

PRESSURE PAD ENGAGEMENT MECHANISM USING SLIDING ACTUATOR

BACKGROUND OF THE INVENTION

The present invention relates to the field of Point of Sale (POS) devices and, more particularly, to a pressure pad engagement mechanism using a sliding actuator for a scanning/printing component of a POS device.

Computing devices exist that are able to scan information from checks and to print content upon the checks. These devices are used in many point of sale (POS) systems. The printing placed on the checks is typically a document control number (DCN) or other customer information that is placed on the back of the check during a checkout process. The scanning of a check requires a Magnetic Ink Character Recognition (MICR) reader. That is, check data is printed with magnetic ink or toner, usually containing iron oxide. The magnetic printing is used so that characters can be reliably read (using a MICR reader) into a system, even when the check has been overprinted with other marks, such as cancellation stamps.

In order for a check scanner/printer to accurately read the magnetic printing on the check, the check paper must be held in close contact with the magnetic read head of the MICR reader. This close proximity can be accomplished by positioning a pressure pad or roller on the side of the paper (e.g., check being read) opposite the MICR read head. In many conventional products, this pressure pad is a spring-loaded device that is always in contact with the paper (e.g., check) even when operations are being performed (e.g., printing) that do not actively require the MICR reader to perform a MICR action. The constant pressure asserted by the pressure pad results in excessive device wear, which shortens a useful life of the check reader/printer. Additionally, the pressurized contact region between the MICR head and the pressure pad can result in paper feed problems, especially when thin media (e.g., checks) is used.

U.S. Pat. No. 6,089,450 to Koeple titled "Receipt Printer having a Check Reading Mechanism with Selective Engagement" teaches a use of a pressure pad that is selectively engaged when a print head carriage is positioned at an actuation location. That is, the pressure pad is in contact with the check opposite the MICR read head only when the print head carriage is at the actuation location. This makes it impossible to perform other carriage related functions during a check reading operation.

DETAILED DESCRIPTION OF THE INVENTION

Figure 1:
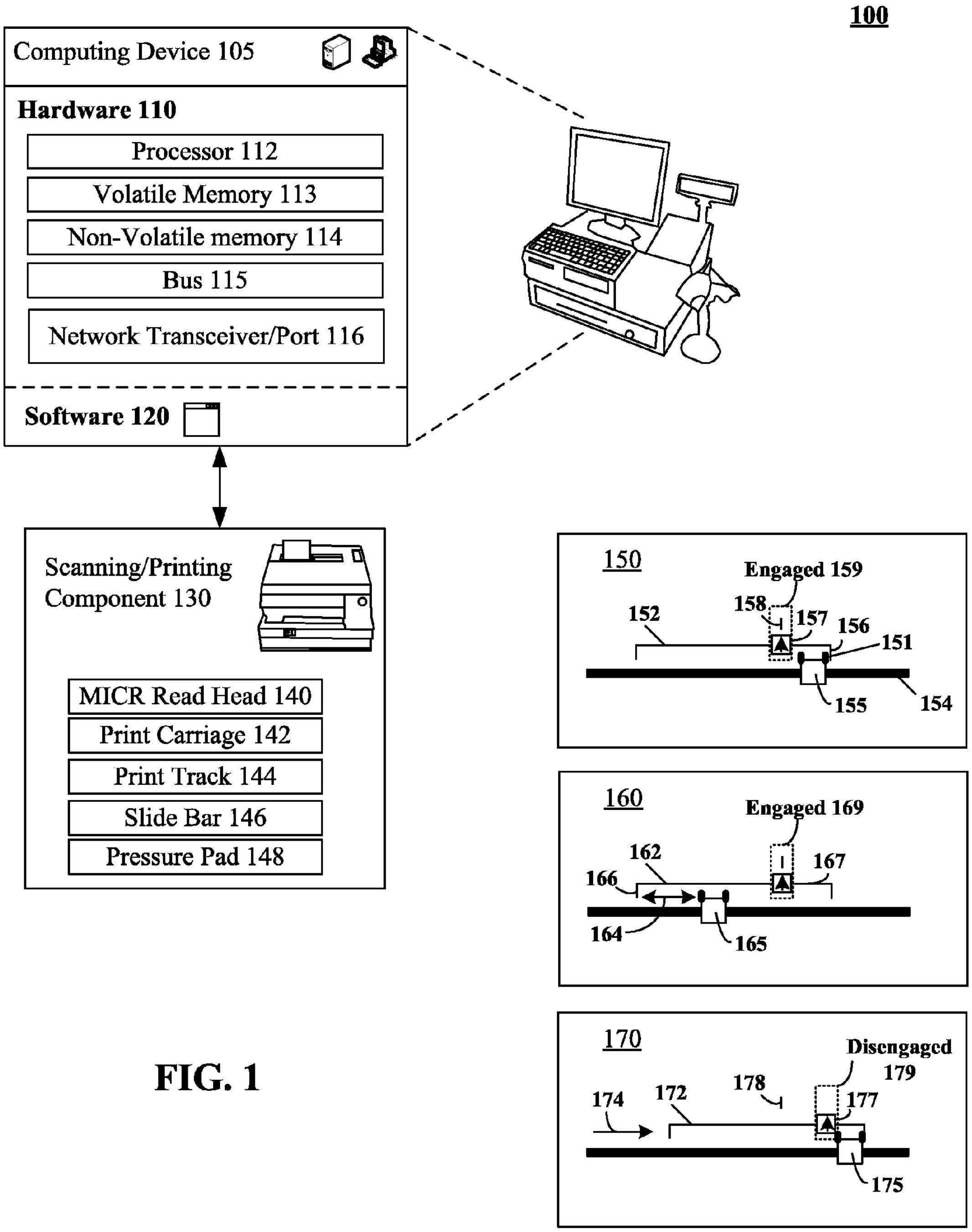
FIG. 1 is a schematic diagram of a system showing a scanning/printing component that selectively engages pressure against a MICR read head using a sliding actuator that is moved when a print carriage moves in accordance with an embodiment of the inventive arrangements disclosed herein.

The present invention discloses a pressure pad engagement mechanism using a sliding actuator. The pressure pad is a component of a check reading and printing device that secures a check to a Magnetic Ink Character Recognition (MICR) read head when engaged. The sliding arm can include an actuation point, which causes a pivot axis to move, which in turn causes the pressure pad to apply pressure opposite the MICR read head. Then the sliding arm is positioned so that the actuation point is not aligned with the pivot axis, the pressure pad does not apply pressure opposite the MICR read head.

The sliding arm can include two sliding arms; the print carriage can include at least one contact point that is able to make contact with each of the two sliding arms as it travels along a track. When the print carriage contacts either arm, the sliding arm moves. The print carriage can reverse, which breaks contact with the sliding arm and results in the slider remaining in a stationary position. Thus, the print carriage can move within a range between the two sliding arms without moving the slider. This permits movement of the print carriage along a track to control whether a pressure pad is engaged or released while permitting a range of movement of the print carriage without affecting the pressure pad engagement state. In other words, the print carriage is free to perform functions (within a defined range of motion along a print track) while check read operations are being performed.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram of a system 100 showing a scanning/printing component 130 that selectively engages pressure against a Magnetic Ink Character Recognition (MICR) read head 140 using a sliding actuator that is moved when a print carriage moves in accordance with an embodiment of the inventive arrangements disclosed herein. The scanning/printing component 130 can be integrated with a computing device 105 (e.g., a Point of Sale (POS) device) and/or can be a peripheral component linked to computing device 105.

As shown, the computing device 105 can include hardware 110 and software 120 that interact with component 130 for reading MICR encoded data from checks and for printing to these checks and/or to other paper (e.g., receipts). The hardware 110 can include a processor 112, a volatile memory 113, and a non-volatile memory 114, which are interconnected to each other through a bus 115. An optional network transceiver/port 116 can connect device 105 to other computing devices. For example, a POS device (e.g., device 105) in a storefront is often communicatively linked to an inventory management system, an accounting system, a credit/debit card charging system, and the like.

The software 120 can include an operating system, and a set of applications. These applications can include POS applications, drivers for component 130, and the like. The software 120 or portions thereof can be alternatively implemented in firmware/hardware. In one contemplated embodiment, the device 105 can be a thin client communicating with a server that provides a portion of the functionality attributed to the hardware 110/software 120 in the embodiment shown in system 100.

The scanning/printing component 130 can include an MICR read head 140, a print carriage 142, a print track 144, a slide bar 146, a pressure pad 148, and the like. The MICR read head 140 can read MICR encoded data, such as data printed on a check. The print carriage 142 can print indicia to printable artifacts, such as receipts, checks, invoices, and the like. When the MICR read head 140 is activated, a pressure pad 148 can be engaged to apply pressure opposite an artifact (e.g., check) being read by the MICR read head 140. When the MICR read head 140 is not active, the pressure pad 148 can be disengaged so that pressure is not applied. Disengaging the pressure pad 148 when not needed (i.e., when MICR read actions are not being performed) minimizes wear and tear on the scanning/printing component 130 and can minimize artifact (e.g., check, paper, etc.) feed problems.

The print track 144 can be a track along which the print carriage 142 travels. The slide bar 146 can be positioned to be moved as the print carriage 142 moves along the print track 144. When the slide bar 146 is positioned in a particular manner, the pressure pad can be engaged. When positioned elsewhere, the pressure pad 148 can be disengaged.

Scenarios 150, 160, and 170 illustrate a relationship between some of the scanning/printing components 130, which results in the selective engagement of the pressure pad 148 based upon slide bar 148 positioning.

In scenario 150, the slide bar 152 can be positioned approximately parallel to the print track 154, which a print carriage 155 moves along. The slide bar 152 can be configured to move to a right and left in approximately directions that the print carriage 155 moves. The slide bar 152 can include an actuation point 157, which when positioned at an engagement point 158 causes a pressure pad (not shown in scenario 150) to be engaged 159.

Movement of the slide bar 152 can result from contact with a contact point 151 and a slide arm 156. That is, a contact point of the print carriage 155 makes contact with a slide arm 156 of the slide bar 152 and pushes the slide bar as the print carriage 155 moves along the print track 154. When the print carriage 155 far enough in an opposite direction, contact between the print carriage 155 (via a contact point) and the slide bar 152 (via a slide arm) can cause the slide bar 152 to move (so that the pressure pad is no longer engaged).

Scenario 160 illustrates that use of a slide bar 162 permits a range of motion to the print carriage 165 along the print track, which does not affect the positioning of the actuation point 167. This, in turn, causes the engagement state of a pressure pad to remain unchanged as the print carriage 165 moves within a designated range 164 (a range where contact is non-existent between a contact point of the carriage 165 and an arm 166 of the slide bar 162. Thus, unlike conventional techniques, where a print carriage 165 must remain at an actuation point 167 during MICR read operations, print carriage 165 functions and MICR read functions can occur concurrently.

Scenario 170 shows a situation where the print carriage 175 moves 174 along the print track to move the slide bar 172. This movement of the slide bar 172 moves an actuation point 177 beyond an engagement point 178, which results in a disengaged state 179. In this disengaged state, a pressure pad no long applies pressure opposite a MICR read head.

It should be appreciated that the components of the scanning/printing component 130 can permit mechanical motions to engage/disengage a pressure pad, where the mechanical motions are driven by movements of a print carriage 142 along a print track 144. Other embodiments are contemplated, which are not purely mechanical. For example, sensors can determine a position of the print carriage 142 along the print track 144, which can convey an electronic signal to a pressure actuator (not shown), where these electronic signals cause the pressure pad to be engaged or disengaged.

As shown herein, the print carriage 142 can be a component configured to print indicia upon a paper artifact proximate to the print carriage. The print carriage 142 can print to receipts, checks, invoices, and the like. The MICR read head 140 can be configured to read indicia printed upon the paper artifact with at least one of magnetic ink and magnetic toner. The MICR read head 140 and feeding mechanisms of the component 130 can be specifically configured for checks and for reading MICR encodings on checks, in one embodiment of the invention. The pressure pad 148 can be engaged to apply pressure opposite the MICR read head 140 during MICR read operations.

The slide bar 146 can have an engaged and a disengaged state. It can also be configured to be moved as the print carriage 142 moves along the print track 144, where the print carriage 142 can physically contact the slide bar 146 to cause it to move. When the slide bar 146 is engaged the pressure pad 148 can applies pressure to the paper artifact so that the paper artifact is positioned near the MICR read head 140. This pressure can be a consistent pressure.

Figure 2:
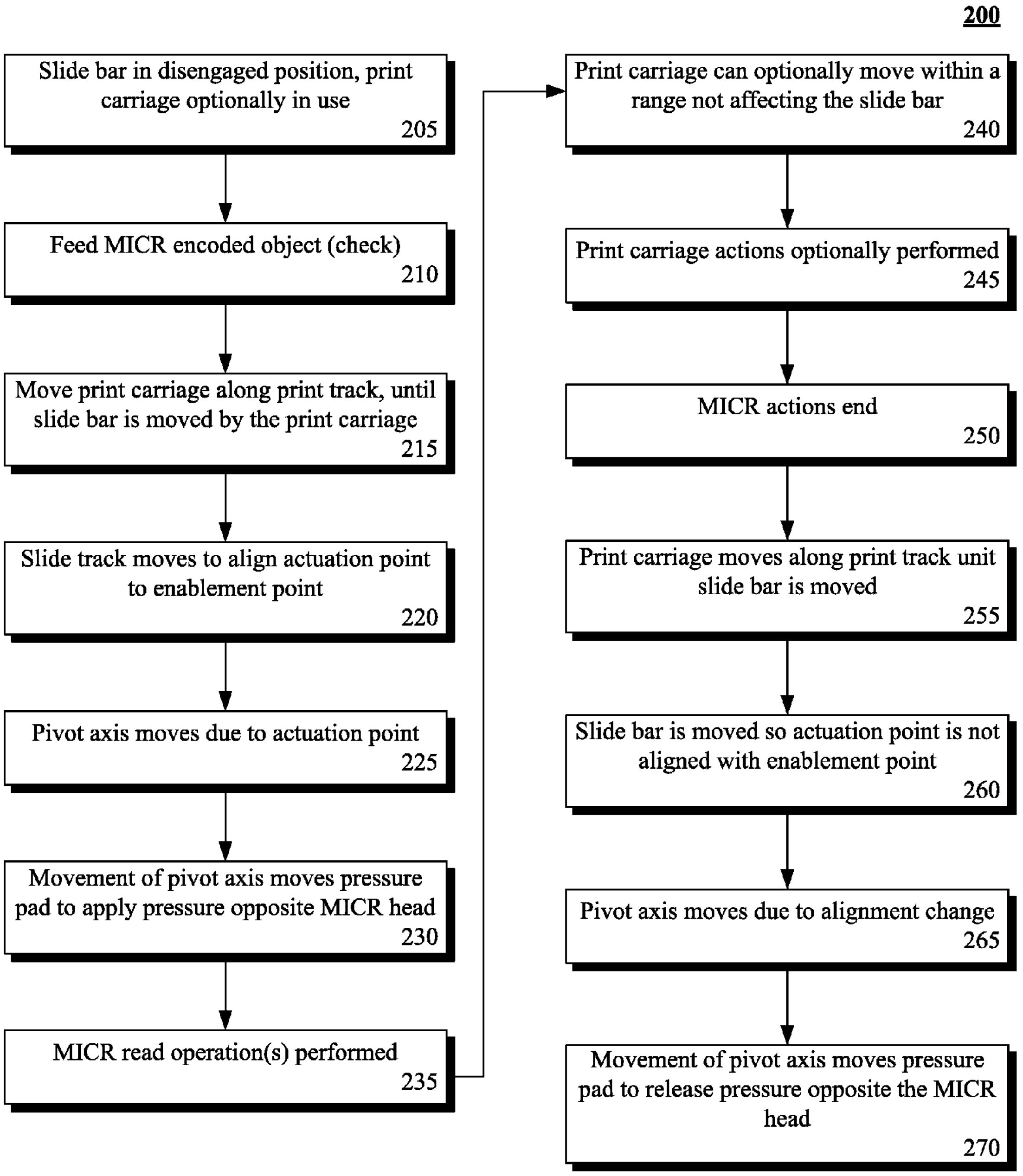
FIG. 2 is a flow chart for selectively engaging/disengaging a pressure pad opposite a MICR head using a slide bar in accordance with an embodiment of the inventive arrangements disclosed herein.

FIG. 2 is a flow chart for selectively engaging/disengaging a pressure pad opposite a MICR head using a slide bar in accordance with an embodiment of the inventive arrangements disclosed herein. The method 200 can be performed in context of system 100.

Method 200 can begin in step 205, where a slide bar can be positioned in a disengaged position and a print carriage can be optionally in use. In step 210, a MICR encoded object, such as a check, can be fed into a printing/scanning component. In step 215, the print carriage can be moved along a print track, until the slide bar is moved by the print carriage. That is, the print carriage can include a contact surface that makes physical contact with a surface of the slide bar, when the print carriage moves along the slide track.

In step 220, the slide track can move to align an actuation point to an enablement point. When aligned, a pivot axis can move, as shown by step 225. In one embodiment, the pivot axis can be spring loaded and the actuation point can be a curved portion of the slide bar permitting additional movement of the pivot axis when aligned. In step 230, movement of the pivot axis engages a pressure pad to apply pressure opposite a MICR head.

In step 235, one or more MICR read operations can be performed. In step 240, the print carriage can optionally move within a range that does not affect the slide bar. For example, if a motion of the print carriage reverses, contact between the slide bar and the print carriage can be severed and the print carriage can freely move (until a different surface of the print carriage makes contact with an oppose contact surface of the slide bar). In step 245, print carriage actions (e.g., printing and/or repositioning the print carriage for subsequent actions) can be optionally performed.

In step 250, the MICR read action(s) can end, which indicates that pressure no longer need be applied by the pressure pad opposite the MICR read head. In step 255, the print carriage can move along the print track until the slide bar is moved. In step 260, the slide bar can be moved so the actuation point is not aligned with the enablement point. In step 265, the pivot axis can move due to the alignment change. In step 270, the movement of the pivot axis can disengage a pressure pad so that pressure opposite a MICR read is released. The method 200 can repeat (shown by looping from step 270 to step 205) so that pressure is selectively applied opposite the MICR head during MICR read actions, but not at other times.

The method 200 is consistent with the scenarios 150, 160, 170, and with the component configurations shown in FIG. 3-FIG. 6. That is, it relies on a mainly mechanical process driven by print carriage motions to selectively engage/disengage a pressure pad opposite a MICR read head. This mechanical process takes advantage that a MICR read head is typically positioned at an extreme end of a print range of a print carriage that is “reserved” for MICR read options and for check printing. One of ordinary skill in the art can recognize, however, that arrangements of components can vary in many manners, all of which are to be considered in scope of the present invention. That is, any arrangement that utilizes a position-able slide bar to selectively apply pressure to a pressure pad for MICR read purposes, where the slide bar is moved based upon movements of a print carriage along a print track, is to be considered within scope of the present invention.

Figure 3:
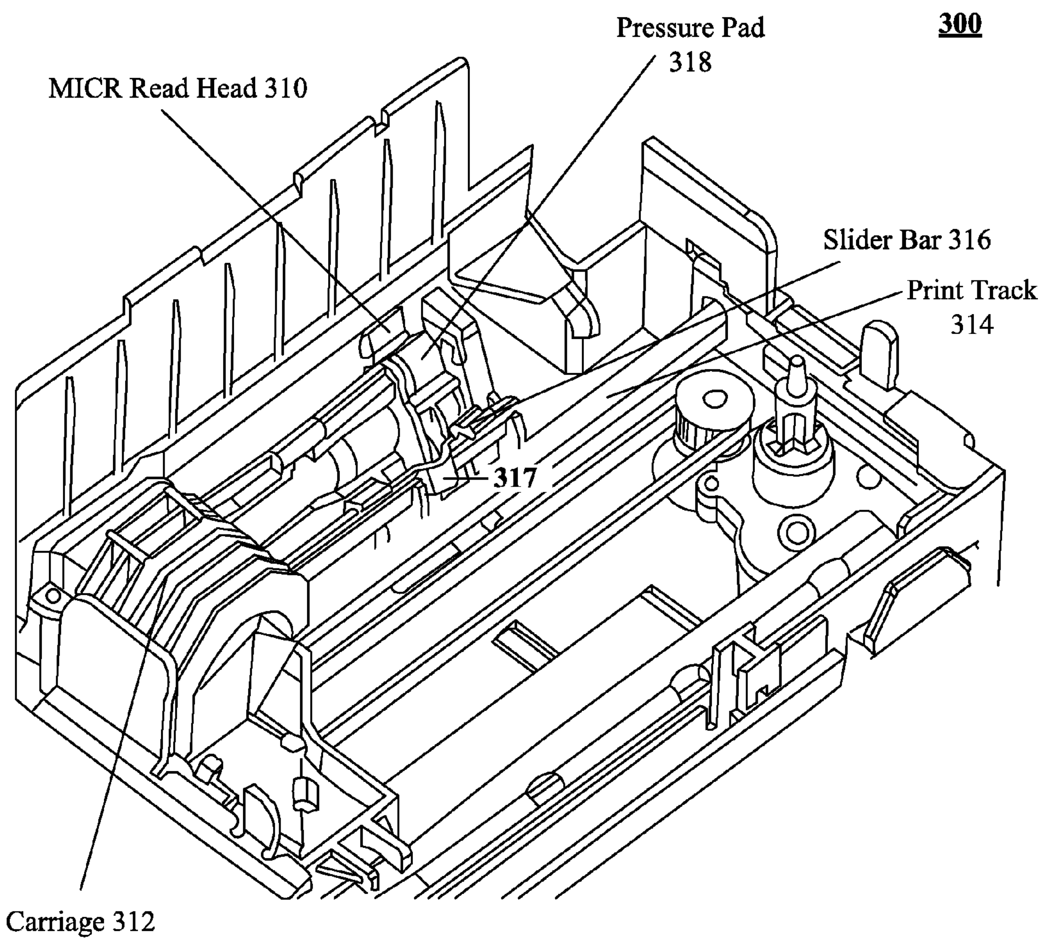
FIG. 3 is a schematic diagram of a scanning/print component in accordance with an embodiment of the inventive arrangements disclosed herein.

FIG. 3 is a schematic diagram of a scanning/print component 300 in accordance with an embodiment of the inventive arrangements disclosed herein. The component 300 can be one contemplated arrangement for component 130 of system 100.

Component 300 includes a print carriage 312 able to move along a print track 314. Movements of the carriage 312 can result in movements of a slider bar 316. The slider bar 316 can include an actuation point 317, which moves as the slider bar 316 moves. In one position, where the actuation point is aligned with the MICR read head 310, a pressure pad 318 is engaged. This pressure pad 318 can apply pressure opposite the MICR read head 310 to ensure reading accuracy. As shown, the pressure pad 318 can be rotatably mounted (as shown it pivots around the roller shaft.

Figure 4:
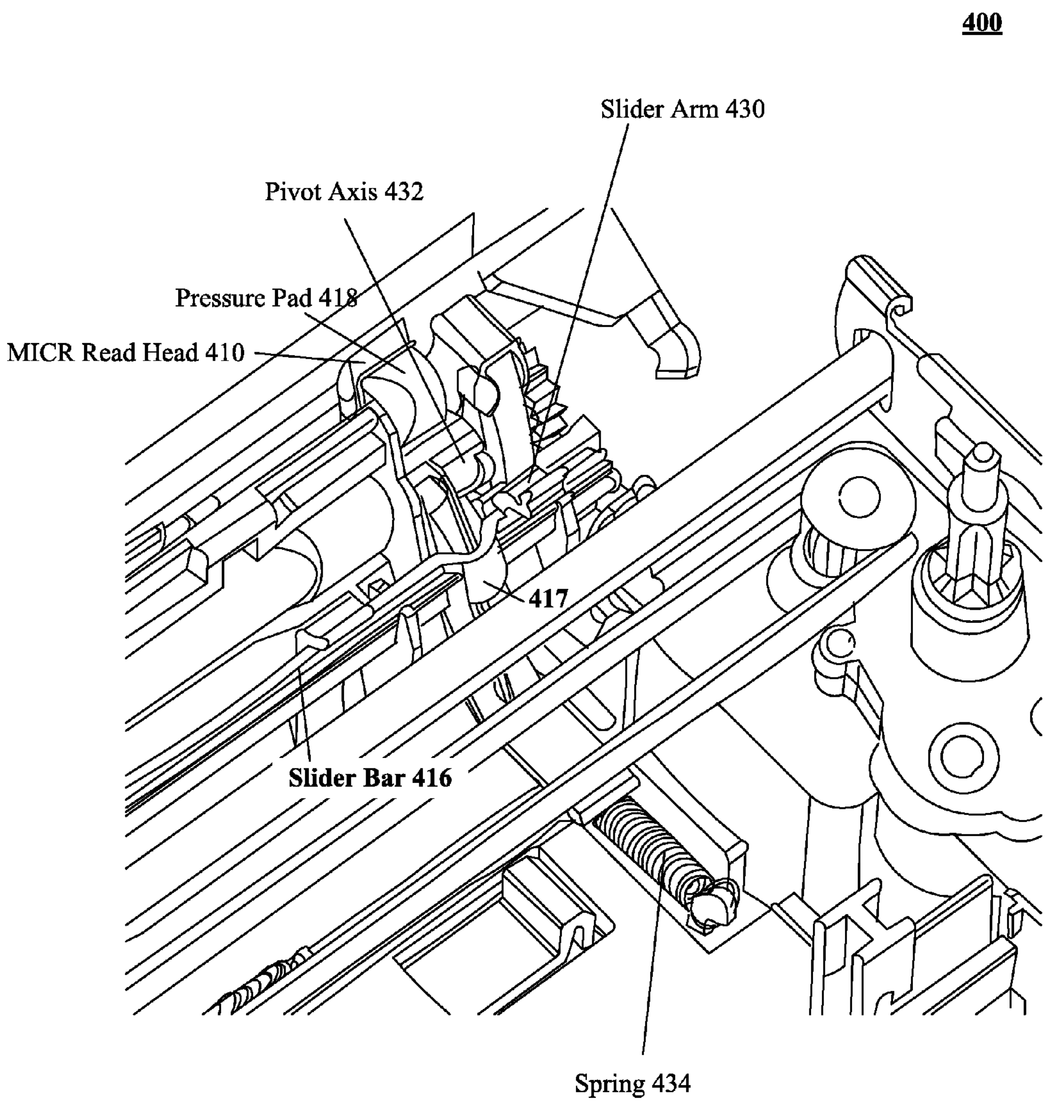
FIG. 4 shows an exploded view of a scanning/print component in accordance with an embodiment of the inventive arrangements disclosed herein.

FIG. 4 shows an exploded view of a scanning/print component 400 in accordance with an embodiment of the inventive arrangements disclosed herein. The slider arm 430 shown in FIG. 4 is a surface of the slider bar 416, which makes contact with a print carriage. Another slider arm 430 can be positioned at an opposing side of the slider bar 416.

Component 400 shows an actuation point 417, which when aligned with a pivot axis 432 causes the pivot axis 432, which is attached to spring 434, to move vertically. Movements of the actuation point 417 are horizontal, as are movements of the slider bar 416 and print carriage (not shown) along a print track. When the pivot axis 432 moves vertically upward (occurs when the actuation point 417 is aligned with the pivot axis 432), the pressure pad 418 is engaged, which applies pressure opposite the MICR read head 410. When the actuation point 417 is not aligned with the pivot axis 432, the pivot axis 432 moves vertically downward, which releases pressure applied by the pressure pad 418.

In FIG. 4, portions of the component 400 frame are not shown so that the spring 434 can be shown. The spring 434 urges the pad 418 into contact with the head 410 with a consistent force.

Figure 5:
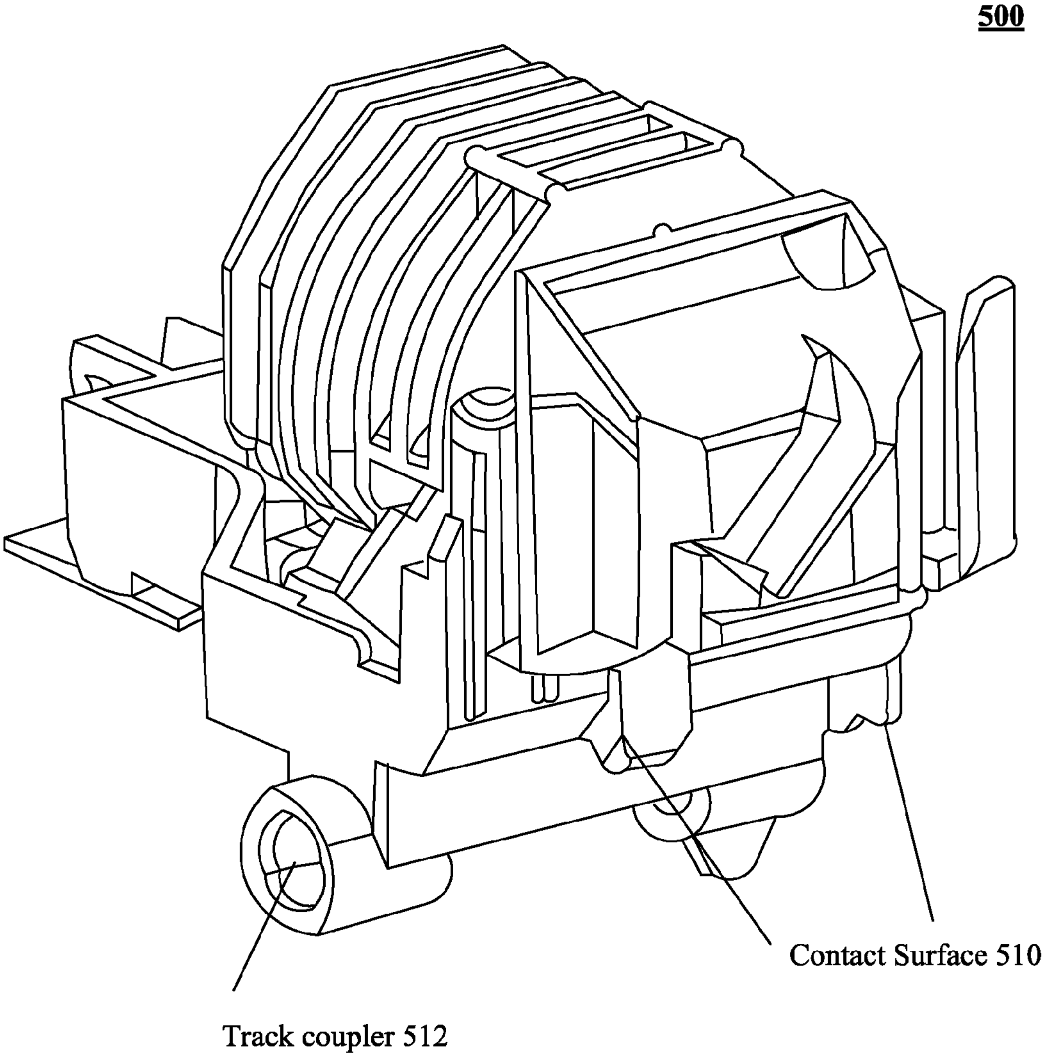
FIG. 5 is a schematic diagram of print carriage in accordance with an embodiment of the inventive arrangements disclosed herein.

FIG. 5 is a schematic diagram of print carriage 500 in accordance with an embodiment of the inventive arrangements disclosed herein. The print carriage 500 can include one or more contact surfaces 510, which are designed to make contact with the slider bar as the print carriage moves along a print track. The print carriage 500 can be connected to the print track via a track coupler 512.

The diagrams in FIGS. 1-5 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A device configured to read and print checks comprising:

a print carriage configured to print indicia upon a paper artifact proximate to the print carriage;

a print track coupled to the print carriage, wherein the print carriage is configured to move along the print track;

a Magnetic Ink Character Recognition (MICR) read head configured to read indicia printed upon the paper artifact with at least one of magnetic ink and magnetic toner;

a pressure pad configured to apply pressure to the paper artifact on an opposing side of the MICR read head during MICR scanning operations;

a slider having an engaged and a disengaged state, wherein when the slider is engaged the pressure pad applies pressure to the paper artifact so that the paper artifact is positioned near the MICR read head, and wherein when the slider is disengaged the pressure pad does not apply pressure to the paper artifact, said slider comprising two surfaces configured to selectively make contact with a surface of the print carriage as the print carriage moves along the print track, wherein contact with a right most slider surface as the print carriage moves in a rightward direction results in the slider moving in the rightward direction, wherein contact with the left most slider surface as the print carriage moves in a leftward direction results in the slider moving in the leftward direction, wherein the print carriage has an intermediate range of motion along the print track that does not result in contact between the print carriage and one of the slider surfaces and therefore does not result in the slider moving, wherein movement of the slider resulting from movement of the print carriage is configured to toggle the slider between the engaged and the disengaged state.

2. The device of claim 1, further comprising:

pivot axis having at least two positions, wherein when the pivot axis is in a first one of the at least two positions the pressure pad applies pressure to the paper artifact, wherein when the pivot axis is in a second one of the at least two positions the pressure pad does not apply pressure to the paper artifact; and an actuation point in the slider, wherein a position of the actuation point relative to the pivot axis changes as the slider moves, wherein when the actuation point is aligned with the pivot axis, the pivot axis is placed in the first position, and wherein when the actuation point is not aligned with the pivot axis, the pivot axis is placed in the second position.

3. The device of claim 2, wherein the slider is positioned within the device to be relatively parallel to the print track, wherein slider movement is relatively parallel to print carriage movement, and wherein the slider is positioned within the device to be relatively perpendicular to the pivot axis, wherein the movement of the pivot axis relative to movement of the print carriage is relatively perpendicular to movement of the pivot axis.

* * * * *